(12) United States Patent
Hinton et al.

(10) Patent No.: US 8,244,907 B2
(45) Date of Patent: Aug. 14, 2012

(54) BROWSER-BASED LOGOFF FROM DISTRIBUTED AND FEDERATED ENVIRONMENTS

(75) Inventors: Heather Maria Hinton, Austin, TX (US); Sridhar R. Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 11/872,847

(22) Filed: Oct. 16, 2007

(65) Prior Publication Data
US 2009/0100438 A1    Apr. 16, 2009

(51) Int. Cl.
*G06F 15/16*    (2006.01)
(52) U.S. Cl. ....................................................... 709/237
(58) Field of Classification Search ................... 709/237
See application file for complete search history.

(56) References Cited

U.S. PATENT DOCUMENTS
2003/0212887 A1* 11/2003 Walther et al. ................ 713/151
* cited by examiner

*Primary Examiner* — Hussein Elchanti
*Assistant Examiner* — Maceeh Anwari
(74) *Attorney, Agent, or Firm* — Jeffrey S. LaBaw; David H. Judson

(57) ABSTRACT

A web browser is provided with a logout enablement function that traps a browser or page shutdown request and prevents that request from completing until the browser (or page) has logged out from one or more current server-side application sessions. The logout enablement function ensures that server-side resources that have been invoked for a given session are released before the web browser can be shutdown. The function is implemented as native browser code, a web page applet, a Java server page, a script, a control associated with the browser, and a browser plug-in.

21 Claims, 7 Drawing Sheets

(RELATED)

BROWSER-BASED LOGOFF FROM DISTRIBUTED AND FEDERATED ENVIRONMENTS

BACKGROUND OF THE INVENTION

1. Technical Field

The present invention relates generally to session management in a multi-tier web environment in which client browsers access back-end application resources through a server front-end.

2. Background of the Related Art

Web portals centralize access to information, applications, and services for employees, customers, or partners. They deliver a consolidated view that lets users access the most important electronic resources of the organization using a standard technology (a web browser), simply and efficiently. Within a Web portal or like environment, typically a proxy or web server acts as a front-end "point of contact" to a set of back-end applications or application components. In this type of multi-tier server-side environment, a user of a client-side web browser authenticates to a back-end application when a first request to the application is made. Upon authentication, the server-side invokes local resources (execution threads, memory, and the like) to handle the session. These server-side resources remain active even if the end user later shuts down his or her web browser on the client-side of the connection. This creates a significant drain on the server-side, as those resources are not then available to service other sessions. It also leaves open the possibility of session hijacking, which may occur when a cookie is stolen before the browser shuts down, as the cookie may then be re-used by some other user after shutdown and before a time-out or disabling of the cookie by the server-side.

BRIEF SUMMARY OF THE INVENTION

A web browser is provided with a logout enablement function that traps a browser or page shutdown request and prevents that request from completing until the browser (or page) has logged out from a current server-side application session. The logout enablement function ensures that server-side resources that have been invoked for a given session are released before the web browser (or page) can be shutdown.

A web browser that implements the logout enablement function may be implemented in a computer-readable medium having processor-executable instructions that perform several steps. In particular, upon receiving a shutdown request, one or more session cookies are retrieved from an in-memory data store, such as a cookie cache. Each session cookie is associated with a server-side application to which a user of the web browser has authenticated during a current browsing session. A logout request is then generated to each server-side application for which a session cookie has been retrieved from the in-memory data store. Upon logout from one or more of the server-side applications, the shutdown request is completed.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

The present invention operates in conjunction within a conventional client-server paradigm in which a client machine (a "client-side") communicates with an Internet-accessible n-tier architecture (a "server-side") executing on a set of one or more machines. End users operate Internet-connectable devices (e.g., desktop computers, notebook computers, Internet-enabled mobile devices, or the like) that are capable of accessing and interacting with the server-side architecture, which architecture typically comprises a web server front-end, together with one or more back-end applications. Typically, each client or server machine is a data processing system comprising hardware and software, and these entities communicate with one another over a network, such as the Internet, an intranet, an extranet, a private network, or any other communications medium or link. As described below, a data processing system typically include one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 1:
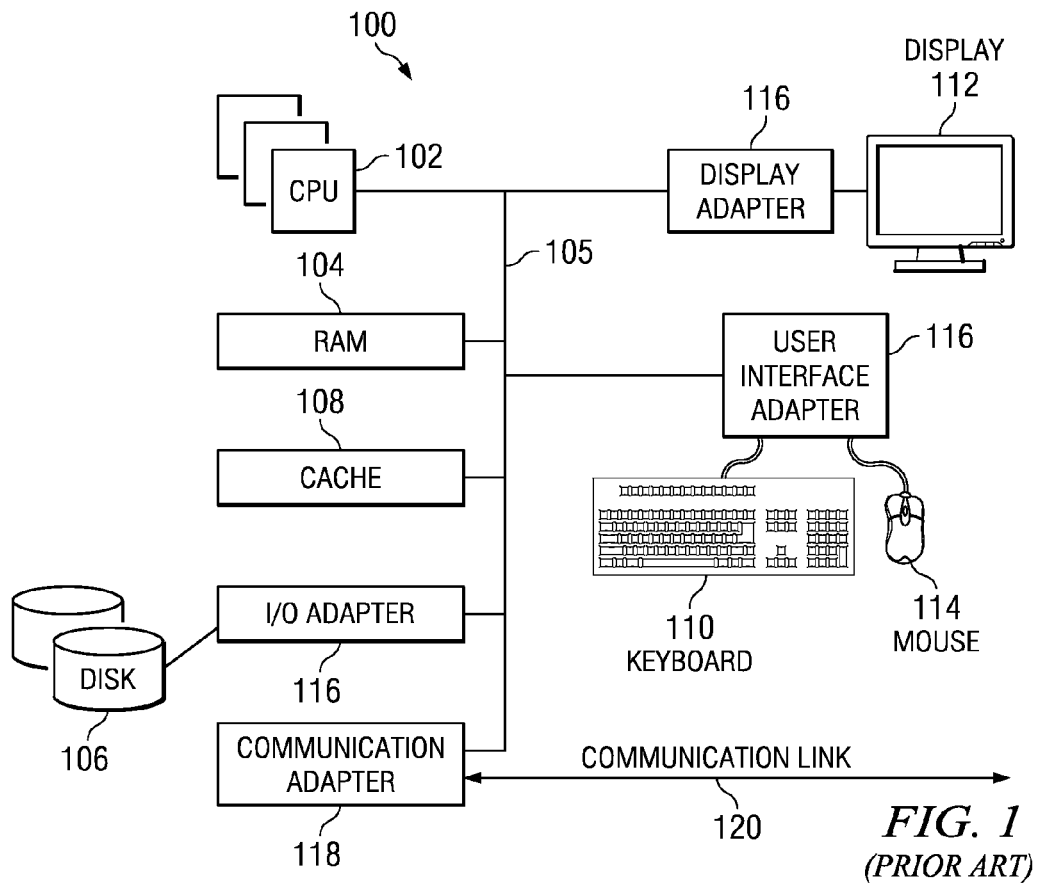
FIG. 1 illustrates a computer system in which the present invention may be implemented.

As will be seen, the subject matter herein provides for a web browser logoff method, preferably implemented as a set of processor-executable instructions in a computer. A simplified block diagram of a representative computer system in which the subject matter described herein may be implemented is shown in FIG. 1. The computer system 100 suitable for storing and/or executing program code includes at least one processor 102 coupled directly or indirectly to memory elements through a system bus 105. The memory elements can include local memory 104 employed during actual execution of the program code, bulk storage 106, and cache memories 108 that provide temporary storage of at least some program code to reduce the number of times code must be retrieved from bulk storage during execution. Input/output or I/O devices (including but not limited to keyboards 110, displays 112, pointing devices 114, and the like) can be coupled to the system either directly or through intervening I/O controllers 116. Network adapters 118 may also be coupled to the system to enable the data processing system to become coupled to other data processing systems or devices through intervening private or public networks 120.

The computer system of FIG. 1 is representative, although the subject matter herein may be implemented in any computing system or device that includes a web browser. As is well-known, an end user accesses a server-side resource in the usual manner, i.e., by opening his or her browser to a URL associated with a host domain. The connection between the client browser and the server-side may be secure, and the browser may connect to the server in any manner over any local area, wide area, wireless, wired, private or other dedicated network.

Figure 2:
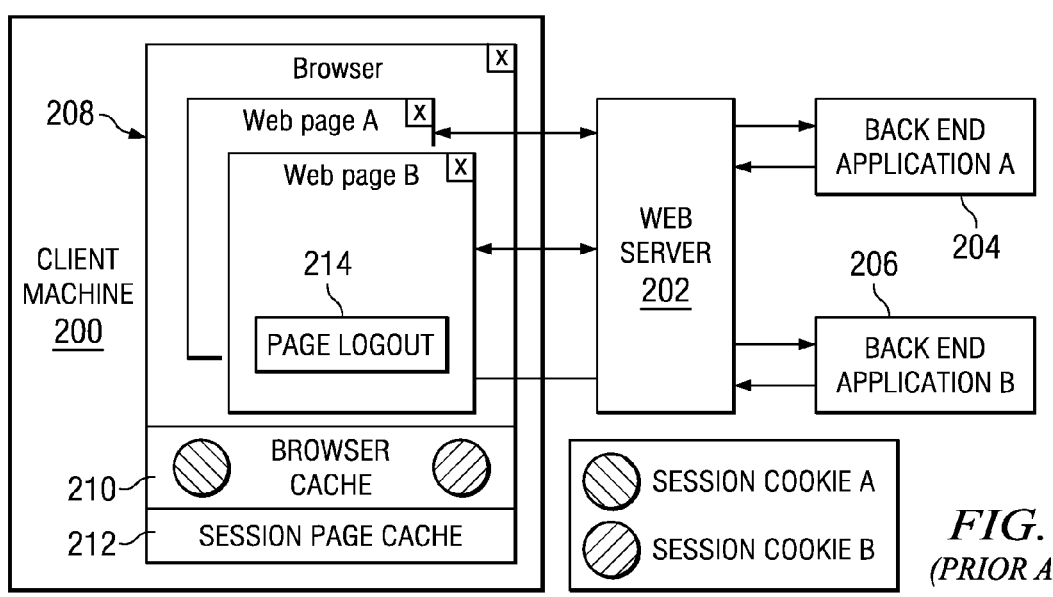
FIG. 2 illustrates a multi-tier environment having a Web server front-end and a back-end set of application resources.

As will be described, the present invention enables a client machine browser to log off from back-end resources within the context of a multi-tier web architecture such as shown in FIG. 2. In a representative architecture, the server-side comprises web server 202, which serves as a front-end (or a first tier) to a set of applications 204 and 206, which applications comprise a back-end (or a second tier). The applications 204 and 206 execute in one or more application servers, which servers may be executing on the same or distinct physical machines. The client machine 200 includes a web browser 208 having a browser cookie cache 210, and a session page cache 212. The browser cookie cache is an in-memory data structure that stores session cookies that are created and passed by the back-end applications when the end user authenticates to a back-end application. Session cookies thus are not persistent. The session page cache 212 stores the URLs at which the back-end applications are accessed. The session page cache 212 may be part of (or linked with) the browser cookie cache 210. In this drawing, web page A is associated with back-end application 204, and web page B is associated with back-end application 206. Each web page has an associated page logout function 214, which is a function implemented or managed by the page designer. As also seen, the browser cookie cache 210 stores first and second session cookies; the first session cookie is associated with back-end application 204, and the second session cookie is associated with back-end application 206. When the page logout function 214 is used, a logout request is issued to the respective back-end application, which, in turn, destroys the associated cookie. Closing the page (but leaving the browser open), however, does not destroy the cookie. In such case, re-opening the page re-activates the cookie if some server-side timeout has not yet expired. In the prior art, closing the entire browser causes all cookies to be destroyed on the client-side, but not on the server-side.

Figure 3:
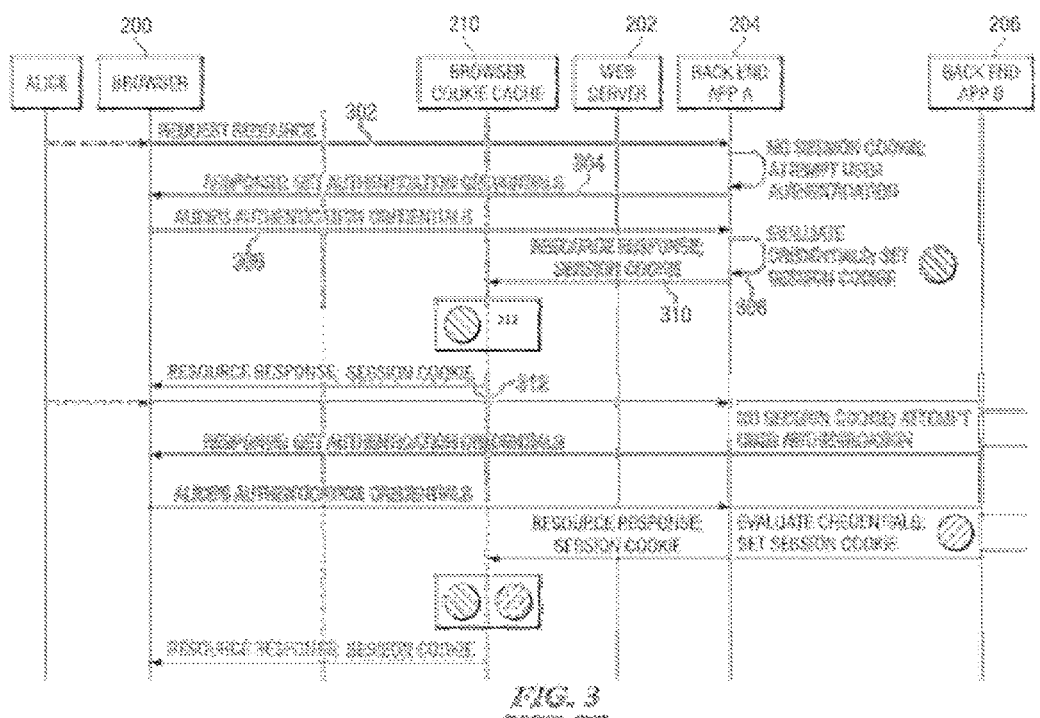
FIG. 3 is a UML sequence diagram illustrating how session cookies are set when a user accesses one or more back-end resources (applications A and B) through a Web server via a client browser.

FIG. 3 illustrates how session cookies are set at the end user's browser. At step 302, the end user makes a request for a resource (web page A) that is associated with application 204. It is assumed the end user has not yet authenticated. At step 304, application 204 issues a response; this response requests the user's authentication credentials. At step 306, the end user enters her credentials (typically user id and password), e.g., via a log-on page, a web services call, or the like. At step 308, application 204 evaluates the credential information. If the user is authenticated, application 204 sets a first session cookie. At step 310, the resource response and the first session cookie are returned from the application to the session page cache 212. The first session cookie is stored in the cookie cache. At step 312, the resource response and first session cookie are provided to the browser. The first session cookie is now "set" at the browser. The remaining portion of FIG. 3 illustrates a similar process, with the end user client browser initiating a session with application 206 by making a request for web page B. As a consequence, a second session cookie is stored in the cookie cache and set at the browser.

Figure 4:
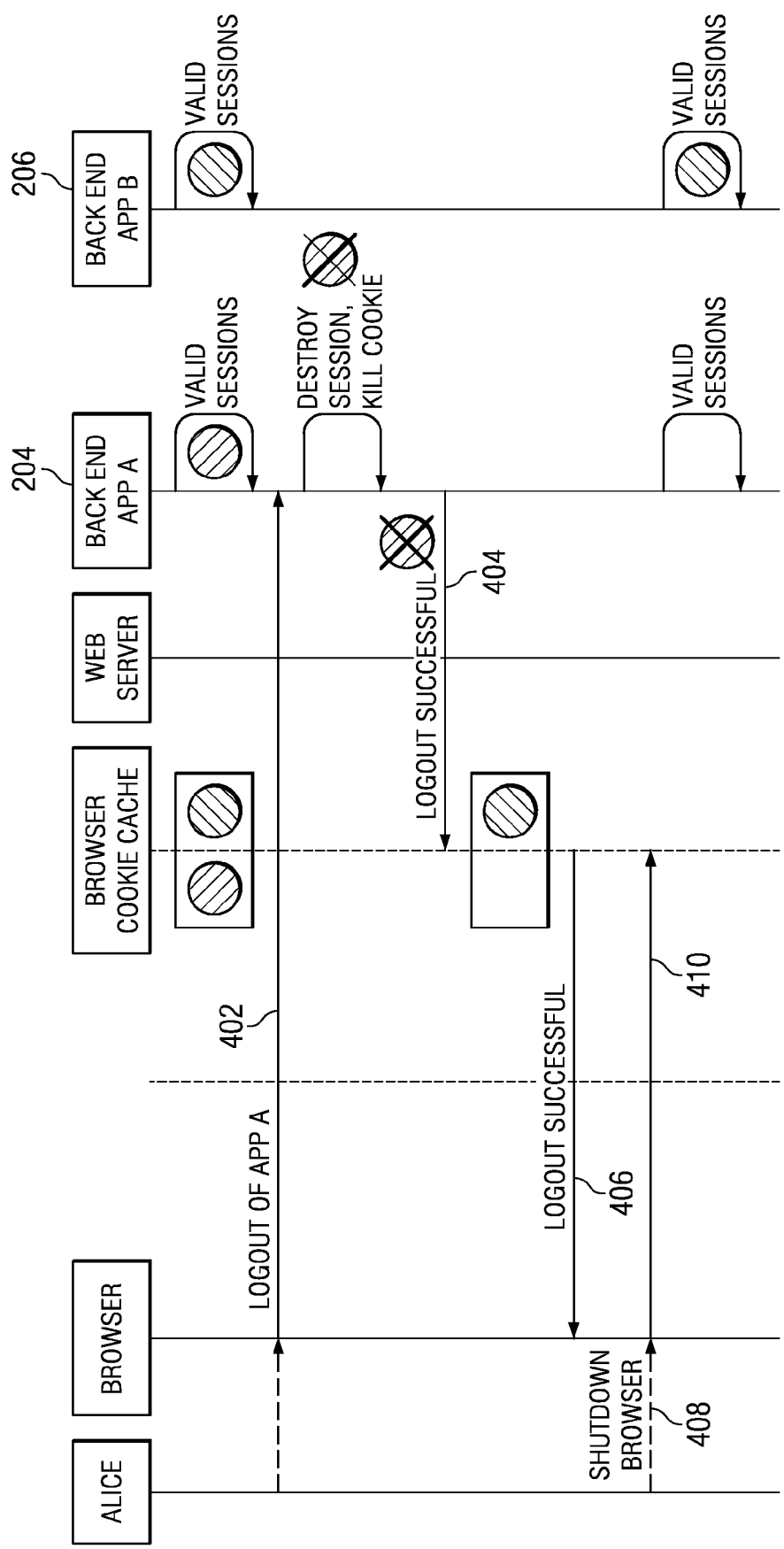
FIG. 4 is a UML sequence diagram illustrating how shutdown of the user's browser does not impact back-end resources that were invoked for the sessions.

FIG. 4 illustrates how logout and browser shutdown operations impact client-side and server-side resources. The upper portion of the diagram illustrates the first and second session cookies located in the session pages cache as a result of the cookie setting operations of FIG. 3. As also seen in the upper portion, the application 204 is maintaining an execution thread and local resources for the session established between the browser and application 204; likewise, the application 206 is maintaining an execution thread and local resources for the separate session established between the browser and application 206. Now, when the end user logs out of application 204 (e.g., by clicking a logout link, by closing a page associated with the application, by entering a new URL and navigating off the page associated with the application), the browser issues a logout request to the application. This is step 402. This logout request causes the application 204 to destroy the session, and to kill the first session cookie (located on the server-side). At step 404, the application 204 issues a logout successful response, together with a string (that corresponds to the first session cookie) and a flag (or the like) that indicates the string (and thus the cookie) is no longer valid. In response, the first session cookie is deleted from the cookie cache. At step 406, the logout successful response is passed back to the browser to complete the logout. At this point, however, the second session cookie remains in the cache.

Now, assume that the end user shuts down the browser. This is illustrated at step 408. In response, the browser issues a shutdown request at step 410. While this request may cause the second session cookie (and any other in-memory cookie) on the client-side to expire or be destroyed, that second session cookie is still being held by the execution thread and local resources associated with server-side application 206. The maintenance of this execution thread causes a significant performance and memory drain on the server-side, which is highly undesirable.

Figure 5A:
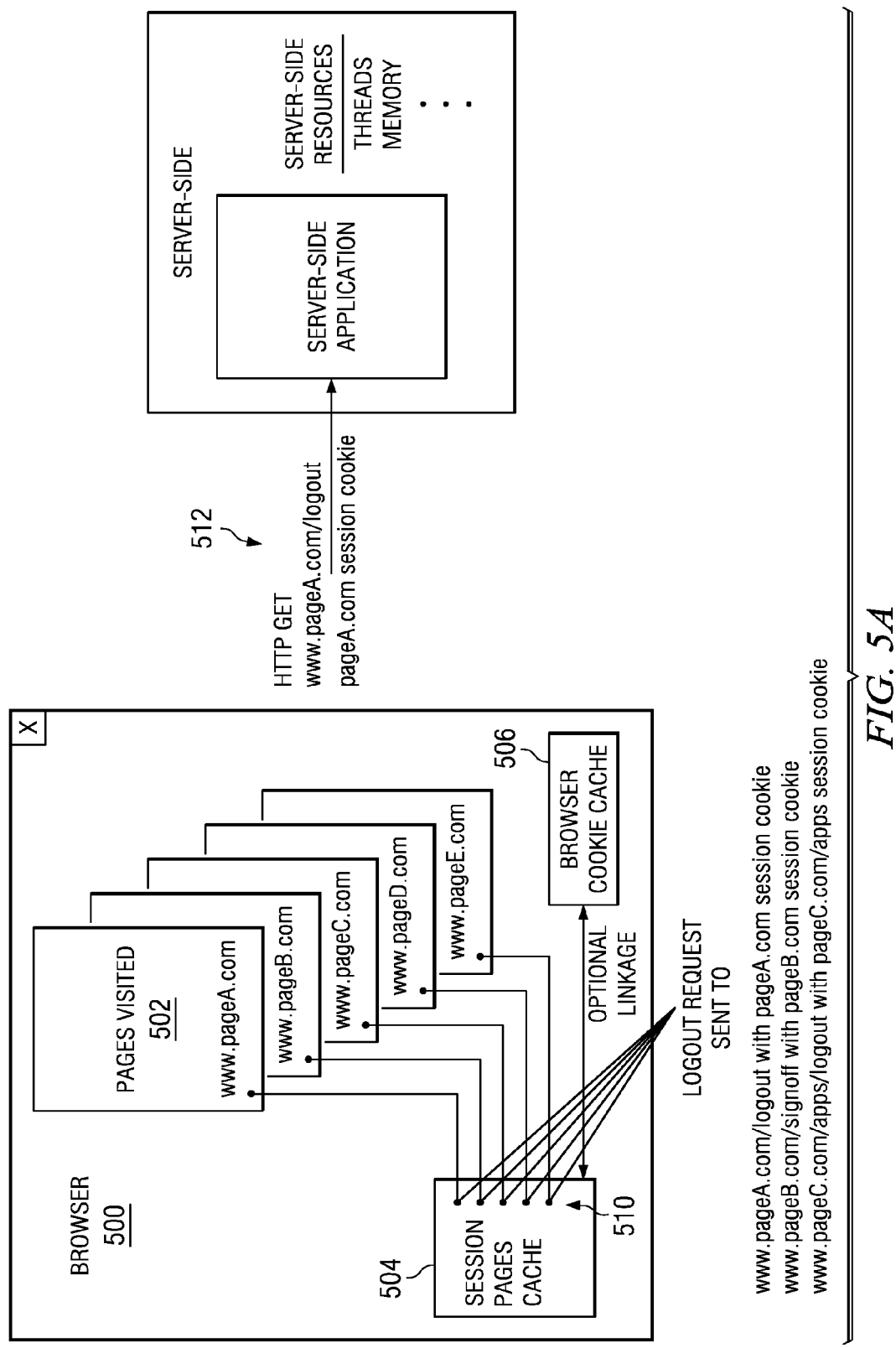
FIG. 5A illustrates the basic function of the browser logout enablement function described herein.

The present invention addresses this problem by providing a browser logout enablement function, which is now described. The logout enablement function traps a browser shutdown request and, in response, issues a logout request to each server-side application associated with client-side in-memory session cookie. This operation has the highly desirable property of ensuring that all server-side applications that have had sessions associated therewith destroy their session cookies and release their associated local resources (execution threads, memory, data structures, and the like). FIG. 5A illustrates this basic functionality.

As illustrated, the browser 500 includes several in-memory structures, including a set of pages that have been visited 502, the session page cache 504, and the browser cookie cache 506. In this example, the end user has five (5) sessions opened, corresponding to the pages www.pageA-E.com, and there are five (5) session cookies 510 located in the session pages cache 504. When the browser shutdown request occurs, the logout enablement function traps the request, fetches the session cookies, and issues the logout requests (in this case to each of the five (5) applications). In particular, and as illustrated in FIG. 5A, a logout request 512 typically is formatted as an HTTP GET or HTTP POST, e.g., GET www.pageA-.com/logout, which also passes the pageA.com session cookie that had been previously set and stored in-memory in the cookie cache 506. This logout request terminates the server-side session resources, as has been described.

In a preferred embodiment, the logout enablement function (LEF) is implemented when the browser itself is shutdown.

Figure 5B:
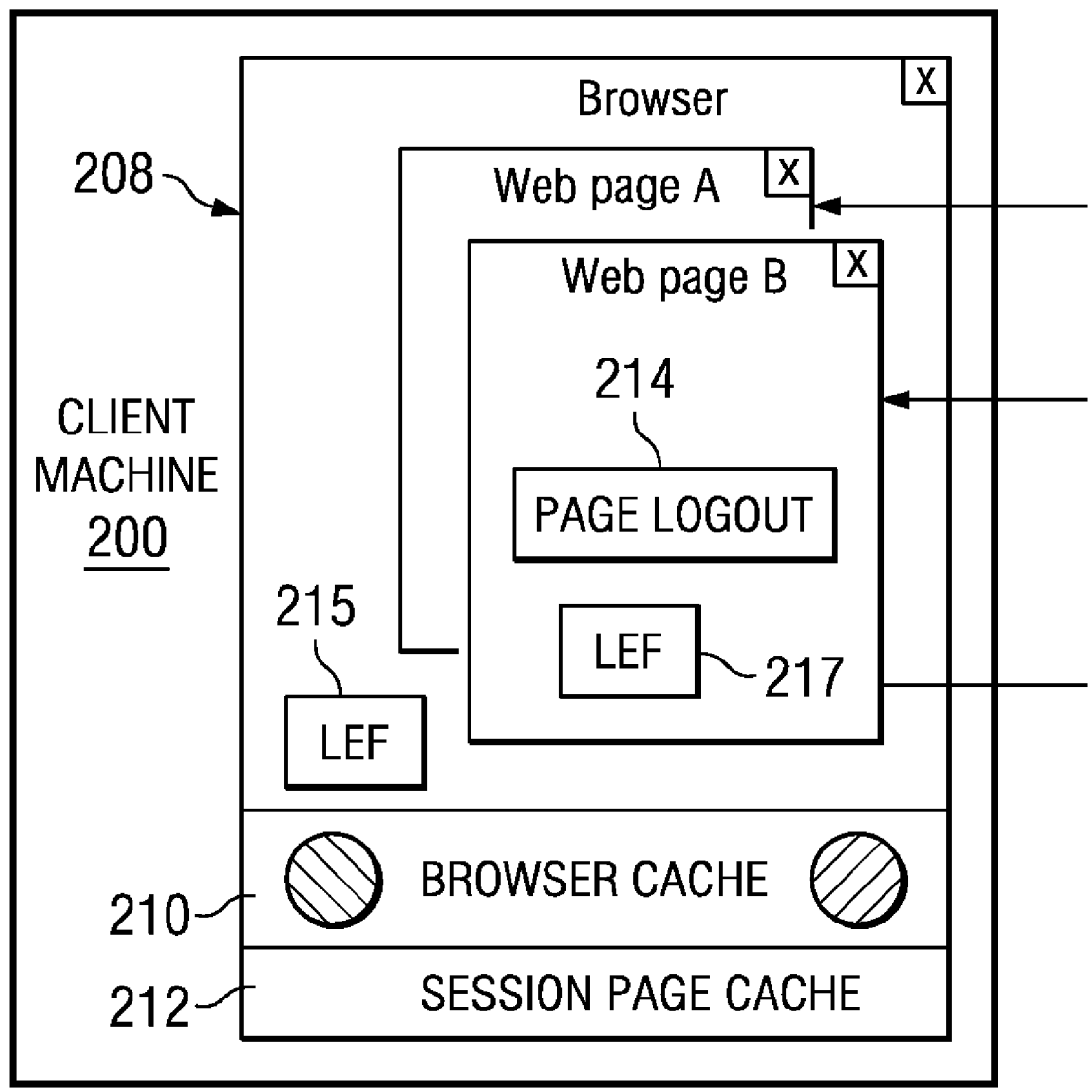
FIG. 5B illustrates how the logout enablement function may be implemented by either a browser shutdown, or a page shutdown.

Thus, for illustrative purposes, this function is shown as reference numeral 215 in FIG. 5B. In an alternative embodiment, the LEF is enabled when a given web page is shut down, which functionality is illustrated as reference numeral 217 in FIG. 5B. In particular, it is known to operate a browser with multiple open pages. This is sometimes referred to as a "tabbed" environment. When a page is shut down in this environment, access to the back-end application (associated with that page) is closed, but the other tabs in the browser typically remain active. Thus, in an alternative embodiment, the browser logoff enablement function is bound to the browser but carried out only when a page is shut down, even if the browser has one or more other active tabs. In such case, the "browser" LEF is really a "page" logoff enablement function. Of course, any one or more of the pages may have its own LEF.

Figure 6:
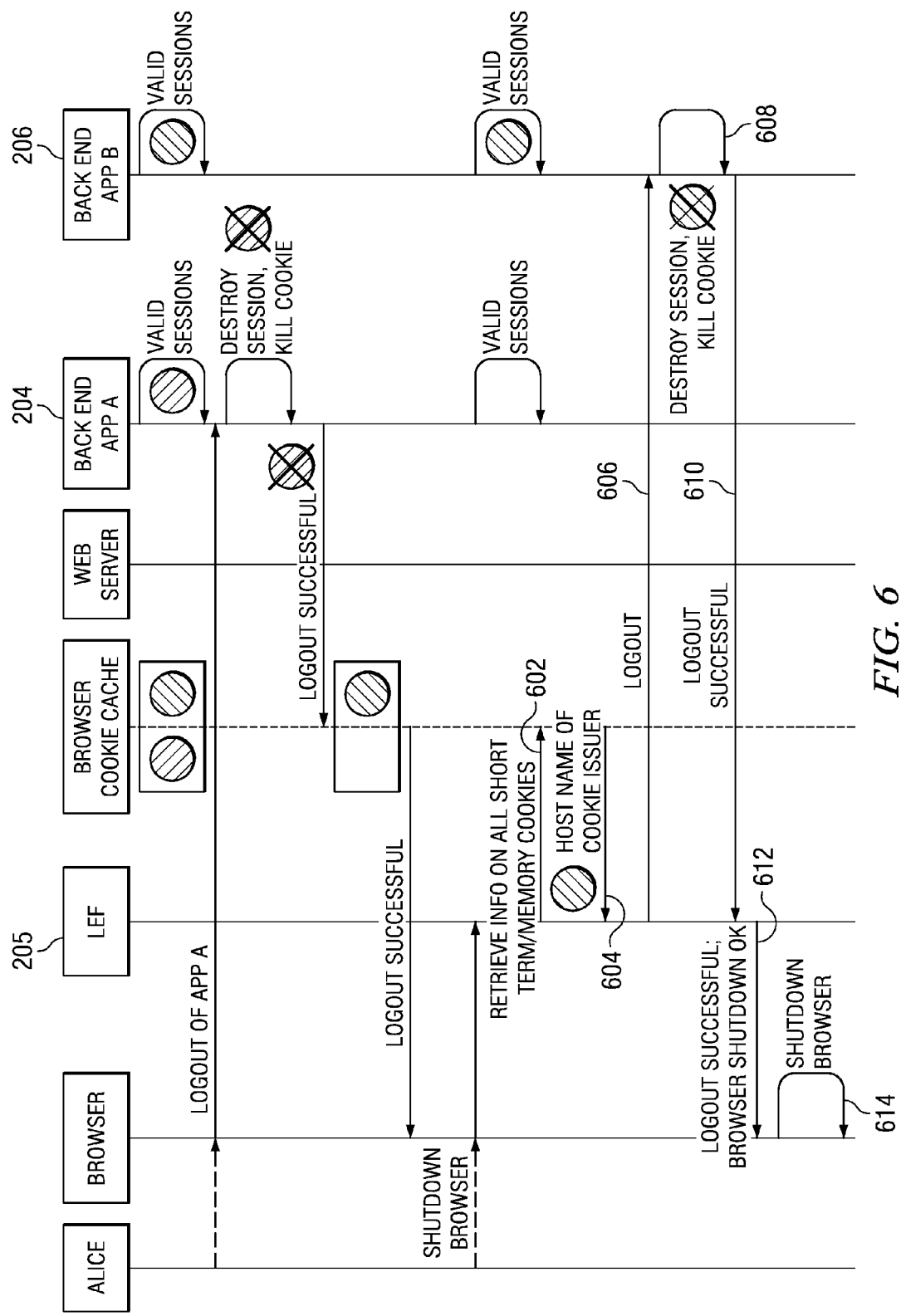
FIG. 6 is a UML sequence diagram illustrating how the logout enablement function described herein operates.
Figure 7:
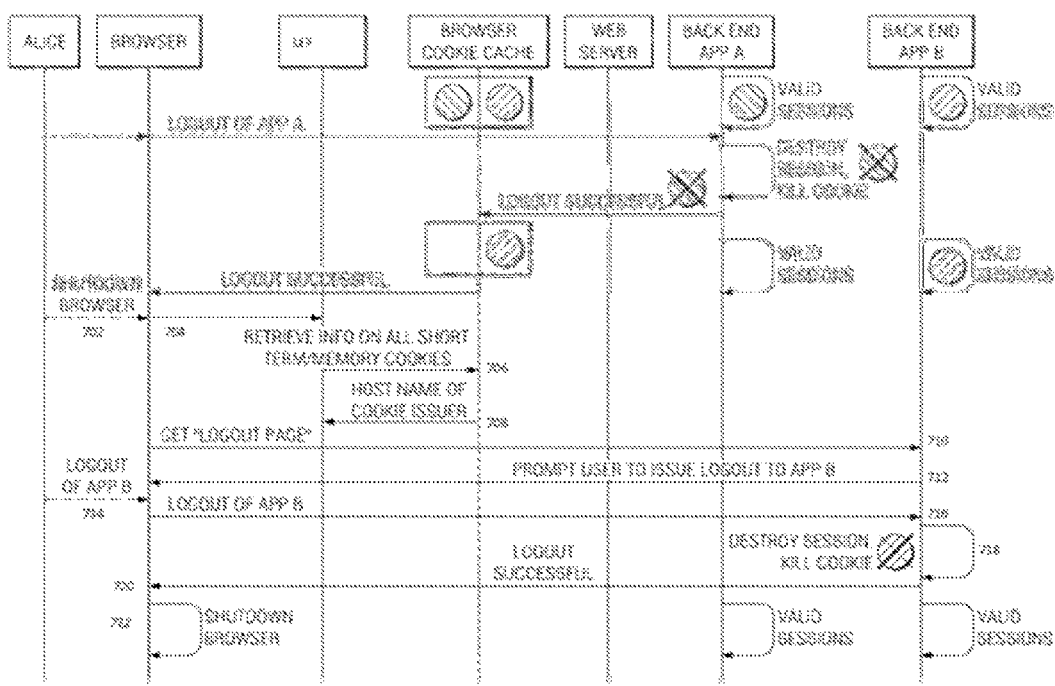
FIG. 7 is another UML sequence diagram illustrating an alternative embodiment of the logout enablement function.

FIG. 6 and FIG. 7 illustrate two variations of the logout enablement function (LEF) 205. In FIG. 6, the logout enablement function 205 is implemented automatically or "under the covers" when the browser shutdown occurs. In FIG. 7, in contrast, the end user is prompted (e.g., via a popup or the like) whether he or she desires to log out of the back-end application sessions. The automatic operation is preferred, and it is described now. By way of reference, the top half of the drawing reiterates what was described in FIG. 4 where the end user performs a proper logout of application 204 and then shuts down the browser. Unlike FIG. 4, however, here the logout enablement function traps the browser shutdown and performs the following steps. At step 602, the logout enablement function retrieves information on all of the in-memory session cookies. As shown in FIG. 5, typically these short term session cookies have been stored in the browser cookie cache, although they may be stored elsewhere as has been described. At step 604, a session cookie (in this case the second session cookie as set in FIG. 2) is returned to the logout enablement function. At step 606, the logout enablement function issues the logout request to application 206. The URL for application 206 typically is obtained from the session page cache. The format of the logout request was illustrated in FIG. 5, and typically it is an HTTP GET or POST request, although any convenient message may be used. A logout request is issued for each session cookie, as typically there will be more than one active session. As a result of the logout request, at step 608 the application 206 destroys the session and kills the second session cookie, which up to the time had been maintained in association with application 206. Local server-side resources associated with the session are released. At step 611 the application 206 issues a logout successful response, which is received by the logout enablement function. At step 612, the logout enablement function passes the logout successful response back to the browser, thereby releasing the browser to complete the shutdown. At step 614, the browser shuts down. If more than one logout request has been sent, preferably step 614 is delayed until the browser receives a response from each of the server-side applications (in other words, browser shutdown is not completed until all server-side applications have provided the logout response).

Thus, according to the invention, the browser logout enablement function traps the browser shutdown request and issues logout requests to whatever applications or hosts have client-side in-memory cookies (and, in particular, the types of cookies that are normally killed by the browser on the client-side when the browser is shutdown).

FIG. 7 shows the alternative embodiment where the end user is prompted to determine whether he or she desires to log out from each the back-end application sessions. This prompting may be done on a session-by-session basis, or in the aggregate (meaning that an affirmative response initiates the log out from each server-side session that has an associated client-side in-memory cookie, as has been described). FIG. 7 is similar to FIG. 6 with the exception of the prompting functions. In particular, at step 702 the end user has shut down the browser. This action causes the browser to issue the shutdown request at step 704. As previously described, the logout enablement function traps this request and, at step 706, retrieves the data from the in-memory store. At step 708, the session cookie (once again the second session cookie as described in FIG. 2) is returned to the logout enablement function. In this embodiment, however, the logout enablement function prompts the user to determine whether the user desires to logout of application 206. To accomplish this operation, the browser fetches a logout page at step 710. At step 712, the user is prompted in any convenient manner, e.g., via a popup generated by the application. If the end user responds affirmatively at step 714, the browser issues a logout request to application 206. This is step 716. At step 718, the application destroys the session and kills the second session cookie, as before. At step 720, the application 206 issues the logout successful response. When the browser receives this response, it shuts down. This is step 722. As described above, if multiple session cookies (and multiple server-side applications) have been stored for the current session, the shutdown preferably is delayed until all servers-side applications have been released.

If the user does not respond in the affirmative at step 714, preferably the browser is not closed. In this scenario, the user may be presented the "home" page of the back-end application so that the user can see what he or she is still logged into, perhaps triggering a voluntary logout before re-attempting the browser shutdown.

The browser or page logoff enablement function is implemented in any convenient manner within, or in association with, the web browser. Thus, without limitation, the logout enablement function may be one of: native browser code (i.e., part of the browser executable), a web page applet, a Java server page, a script, a control associated with the browser, a browser plug-in, code associated with a media player, and other web technologies, such as AJAX (XHTML, XML-based request objects, CSS, DOM accessed with client-side scripting, JSON and the like).

Although the present invention typically is implemented in any multi-tier web architecture such as shown in FIG. 2 wherein, for example, a web server is a front-end to one or more back-end applications, the browser logout enablement function may be implemented in association with any server-side infrastructure. One such alternative is a web portal that provides centralizes access to information, applications and services for an enterprise's employees, customers or partners. This type of portal provides a consolidated view that lets users access the most important electronic resources of an organization using a standard technology (a web browser), simply and efficiently. Within a Web portal or like environment, typically a proxy or web server acts as a front-end "point of contact" to a set of back-end applications or application components. It is also known in such systems to enhance security by integrating an enterprise security product with the portal. One such enterprise-level security product, known as Tivoli® Access Manager (TAM), from IBM®, provides a single point-of-user authentication and authorization administration, together with Web-based single sign-on. This type of access manager provides authentication and authorization to Web-based resources, and it provides standards-based APIs that allow back-end Web application servers to access the access manager's security services.

The browser logout enablement function may also be used in association with application resources that are located in a federated environment, such as described in U.S. Publication No. 2006/0021018, filed Jul. 21, 2004. As described there, a federation is a set of distinct entities, such as enterprises, organizations, institutions, etc., that cooperate to provide a single-sign-on, ease-of-use experience to a user. Within a federated environment, entities provide services that deal with authenticating users, accepting authentication assertions (e.g., authentication tokens) that are presented by other entities, and providing translation of the identity of a vouched-for user into one that is understood within a local entity. The browser logout enablement function as described herein may be used to ensure logout from an application or resource of a given entity in a federated environment.

As long as the logoff enablement function has access to the browser cookie cache or its equivalent (and thus can access the cookies), this function may even reside externally to the client itself.

The present invention provides several advantages. As one of ordinary skill in the an will appreciate, the inventive method provides a simple technique to facilitate "browser logoff" with respect to server-side application sessions. An advantage of this technique is that client-side browser shutdown is not permitted until server-side session artifacts (e.g., execution threads, local memory, data structures and session cookies) are first destroyed, killed or released. The inventive approach is lightweight, in that it is implemented entirely on the client-side; thus, the technique can be used with various server-side architectures including simple n-tier architectures, web portals, federated systems, and the like. More generally, the technique can be implemented with respect to any server-side implementation having a front-end (e.g., a web server, a web portal, a point of contact, or the like) to one or more back-end application resources. The invention may be used in any system, device, portal, site, or the like wherein server-set session management data might be otherwise maintained across browser shutdowns. More generally, the invention is designed for use in any operating environment wherein given information (including, without limitation, session management data) and server-side resources are not intended to persist following shutdown of the browser instance (and thus termination of the application session) for which that information was saved and those resources invoked.

More generally, the invention can take the form of an entirely hardware embodiment, an entirely software embodiment or an embodiment containing both hardware and software elements. In a preferred embodiment, the logout enablement function is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a session "cookie" may be generalized as a "data string" or, more generally, a "data structure." In addition, the "server-side application" should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while a "logout request" has been described as an HTTP GET, this is not a limitation either. The logout request may be formatted to conform to the Simple Object Access Protocol (SOAP) and travel over HTTP (over the public Internet), or any other reliable transport mechanism (such as IBM® MQSeries® technologies and CORBA, for transport over an enterprise intranet) may be used.

Finally, as used herein, a "browser" logout enablement function should be deemed to cover either a browser shutdown request or merely a page shutdown request.

Having described our invention, what we now claim is as follows.

The invention claimed is:

1. A computer program product in a non-transitory computer-readable medium for use in association with a web browser in a data processing system, the computer program product holding computer program instructions which, when executed by the data processing system, perform a method, the method comprising:
   receiving a shutdown request;
   retrieving one or more session cookies from an in-memory data store, wherein each session cookie is associated with a server-side application to which a user has authenticated;
   generating a logout request to each server-side application for which a session cookie has been retrieved; and
   upon logout from all of the server-side applications, completing the shutdown request.

2. The computer program product as described in claim 1 wherein the shutdown request is a browser shutdown request.

3. The computer program product as described in claim 1 wherein the in-memory data store is a browser cookie cache.

4. The computer program product as described in claim 1 wherein the logout request is an HTTP request to a logout page associated with a host name.

5. The computer program product as described in claim 1 wherein the method includes:
   issuing a prompt to the user prior to generating the logout request.

6. The computer program product as described in claim 5 wherein the method further includes:
    determining whether the user has responded to the prompt by indicating a desire to logout from the server-side application.

7. The computer program product as described in claim 1 wherein the computer program instructions are one of: native browser code, a web page applet, a Java server page, a script, a control associated with the browser, and a browser plug-in.

8. A data processing system, comprising:
    a processor;
    system memory; and
    a rendering engine comprising processor-executable instructions, the processor-executable instructions performing a method, comprising:
        receiving a shutdown request;
        retrieving one or more data strings from system memory, wherein each data string is associated with a server-side application to which a user of the rendering engine has authenticated;
        generating a logout request to each server-side application for which a data string has been retrieved from system memory; and
        upon logout from all of the server-side applications, completing the shutdown request.

9. The data processing system as described in claim 8 wherein the shutdown request is a browser shutdown request.

10. The data processing system as described in claim 8 wherein system memory is a cache and the data strings are session cookies.

11. The data processing system as described in claim 8 wherein the rendering engine is a web browser and the processor-executable instructions are one of: native browser code, a web page applet, a Java server page, a script, a control associated with the browser, and a browser plug-in.

12. The data processing system as described in claim 8 wherein the logout request is generated automatically or in response to a user prompt.

13. Apparatus operative in a multi-tier system comprising an application to which a user of a client browser authenticates, and one or more server-side resources invoked in a session upon such authentication, comprising:
    a processor;
    a computer memory holding computer program instructions which when executed by the processor perform a method comprising:
        receiving a logout request to the application, the logout request having been generated by the client browser receiving a shutdown request and retrieving from an in-memory data store a session cookie associated with the application to which the user of the client browser authenticates; and
        issuing a response to the logout request and releasing the one or more server-side resources, wherein issuing of the response to the logout request enables completion of the shutdown request at the client browser.

14. A method, operative in a web browser, comprising:
    receiving a shutdown request;
    retrieving one or more session cookies from an in-memory data store, wherein each session cookie is associated with a server-side application to which a user of the web browser has authenticated;
    generating a logout request to each server-side application for which a session cookie has been retrieved; and
    upon logout from all of the server-side applications, completing the shutdown request.

15. The method as described in claim 14 wherein the shutdown request is a browser shutdown request.

16. The method as described in claim 14 wherein the logout request is an HTTP request to a logout page associated with a host name.

17. The method as described in claim 14 wherein the shutdown request is a page shutdown request.

18. The method as described in claim 14 wherein the logout request to the server-side application is issued automatically and without involvement of the user.

19. The method as described in claim 14 wherein the logout request to the server-side application is issued after determining whether the user desires to logout from the server-side application.

20. The method as described in claim 19 wherein the determination is made by issuing a prompt to the user.

21. The method as described in claim 19 wherein the logout request is formatted as an HTTP request.

* * * * *